Figure 1:
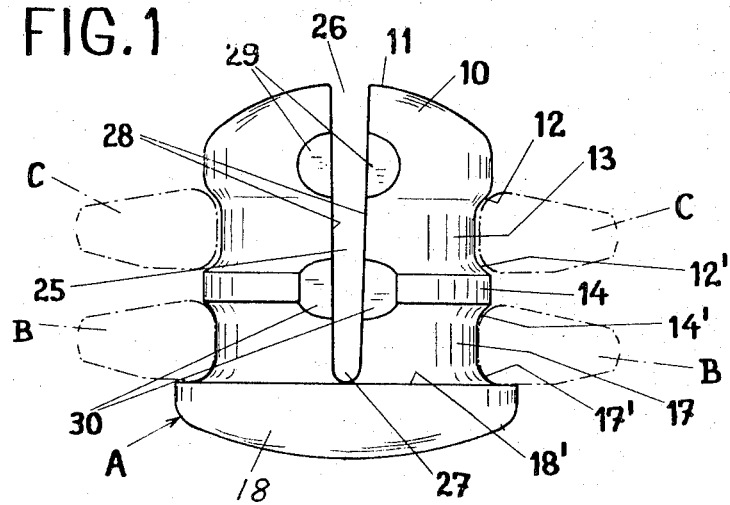

United States Patent [19]
Bengtsson

[11] 3,831,225
[45] Aug. 27, 1974

[54] SPRING FASTENER

[76] Inventor: Sigurd W. Bengtsson, Goteborg, Sweden

[22] Filed: June 5, 1973

[21] Appl. No.: 367,163

Related U.S. Application Data

[63] Continuation of Ser. No. 227,198, Feb. 17, 1972, abandoned.

[52] U.S. Cl............... 24/73 P, 24/213 CS, 85/5 R
[51] Int. Cl.......................... F16b 5/00, A44b 21/00
[58] Field of Search............ 85/5 R; 24/214, 213 R, 24/213 B, 213 CS

[56] References Cited
UNITED STATES PATENTS

| | | | |
|---|---|---|---|
| 270,665 | 1/1883 | Henius | 24/213 CS |
| 584,036 | 6/1897 | Eklund | 24/107 |
| 2,210,993 | 8/1940 | Weatherhead | 85/5 R UX |
| 3,093,027 | 6/1963 | Rapata | 85/5 R |
| 3,651,545 | 3/1972 | Hara | 24/73 P |

Primary Examiner—Donald A. Griffin
Attorney, Agent, or Firm—Hill, Gross, Simpson, Van Santen, Steadman, Chiara & Simpson

[57] ABSTRACT

A spring fastener for connecting together separate layers of flexible sheet material, each of which is provided with a rigid annular eyelet. The spring fastener includes a plug-like body having a head at one end, a stop flange at the other end, and an intermediate flange therebetween. At each side of the intermediate flange there is a circumferential groove, a diametral slot extending axially from the head end to the stop flange. The fastener is molded from resilient plastic material and holds the eyelet in the groove adjacent to the stop flange with somewhat greater force than the eyelet in the other groove.

3 Claims, 2 Drawing Figures

SPRING FASTENER

This is a continuation, division, of application Ser. No. 227,198, filed Feb. 17, 1972, now abandoned.

BACKGROUND OF THE INVENTION

FIELD OF THE INVENTION

This invention relates to a spring-fastener of molded plastic material which is receptive in grommets or eyelets carried by separate layers of flexible sheet material to hold them together detachably.

SUMMARY OF THE INVENTION

The new spring fastener comprises a plug-like body of resilient plastic material having a head at one end and a larger stop flange at the other end, there being an intermediate flange between the ends of the body sized like the head, the body having a diametral slot extending axially through the head and intermediate flange to the stop flange, there being circumferential grooves in the body at both sides of the intermediate flange, less force being required to remove the eyelet from the groove adjacent to the head than to remove the other eyelet whereby the fastener is more permanently retained.

Accordingly, it is an object of the present invention to provide an improved spring fastener.

A further object of the present invention is to provide a spring fastener which is more durably attached to one layer of sheet material than it is to the other.

A further object of the present invention is to provide a spring fastener of the type described that can be utilized with eyelets of identical size.

Yet another object of the present invention is to provide a spring fastener that can be manually installed and manually detached.

Many other advantages, features and additional objects of the present invention will become manifest to those versed in the art upon making reference to the detailed description and the accompanying sheet of drawings in which a preferred structural embodiment incorporating the principles of the present invention is shown by way of illustrative example.

Figure 2:
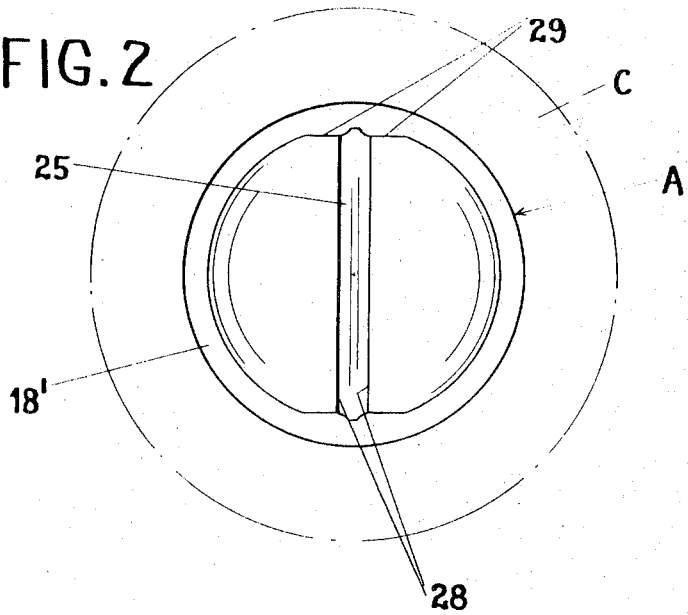

ON THE DRAWINGS:

FIG. 1 is a side elevational view of a spring fastener provided in accordance with the principles of the present invention, and also shown in assembled relationship with two eyelets that are illustrated in dot-and-dashed lines; and FIG. 2 is a top view of the structure of FIG. 1.

AS SHOWN ON THE DRAWINGS:

The principles of the present invention are particularly useful when embodied in a spring fastener such as shown in FIG. 1, generally indicated by the letter A, the same being a unitary plug-like body of relatively rigid plastic material that is resilient. The body A has a head 10 at one end 11 which merges into a narrower neck or groove 13, the groove 13 having a cylindrical central section that blends with an arcuate portion 12 at the upper end and with a further arcuate portion 12' at the lower end. The arcuate portion 12' merges into an intermediate flange 14 which merges into a further arcuate portion 14' which forms part of a groove 17 by blending with a cylindrical central portion thereof that merges with a further arcuate portion 17'. The portion 17' blends into a stop face 18' carried on a stop flange 18 which has a diameter larger than the head. The diameter of the intermediate portion 14 is substantially the same as that of the head 10. The grooves 13, 17 can thus be said to have radial cross sections which are concave and thus arcuate. The arcuate portions 12', 14' comprise axial side surfaces of the intermediate flange 14.

The body A has at least two radial slots here formed together as a diametral slot 25 which extends axially of the body A. The slot 25 has an open outer end 26 at the head 10 and a closed inner end 27 which is close to the stop flange surface 18'. The slot 25 has straight side surfaces 28 which diverge from the closed end 27 to the open end 26. The circumferential groove 17 remotely from the slot 25 has a diameter at the cylindrical portion or smallest diameter portion which is larger than the corresponding dimension of the circular groove 13, so that the fastener has a tighter fit with the first eyelet B that is applied than it does with the second eyelet C, so that the material having the eyelet C can be more readily detached from the spring fastener, and so that the spring fastener is more durably attached to the eyelet B. Further, when the head 10 is squeezed so as to compress the slot 25, the upper eyelet C will more easily slide off the head 10 than the eyelet B will slide past intermediate flange 14. To facilitate assembly and disassembly, the head 10 is slightly truncated at 29 at diametrally opposite points on the head 10, and the intermediate flange 14 is similarly truncated at 30 at diametrally opposite points of the slot 25. Except for the slot 25 and the truncated portions 29, 30. the body is a solid of revolution. Therefore, the profile illustrated at either side of FIG. 1 can be considered a generatrix which defines the outer shape of the device. The structure at opposite sides of the slot can be considered as being two bending spring portions separated by such slot 25. The eyelets B and C have the same inner diameter and the head 10 and the intermediate flange 14 have the same outer diameter as each other. Under these conditions, a substantially greater force is needed to push the eyelet B over the flange 14 to the position illustrated and to remove the eyelet B in the opposite direction past the flange 14, than is needed to install or remove the eyelet C over the head 10. By this arrangement, the eyelet B is anchored more durably or permanently to the spring fastener than is the other eyelet, and this securement can be considered to be permanent, whereas the eyelet C is readily assembled and removed from the fastener. The truncated portions 29, 30 enable or facilitate the assembly and disassembly described when clearances are small.

The invention is not restricted to the embodiment shown in the drawing. For example, the number of slots 25 can be increased, and the degree of divergence of the side surfaces 28 can be altered such as by making the side surfaces 28 parallel. The spring fastener of this invention can be utilized with various kinds of flexible sheet material which is provided with a hole, the hole edges being lined by an eyelet at each point that the sheet is to be attached. The eyelets are rigid and typically comprise brass.

Although various minor modifications might be suggested by those versed in the art, it should be understood that I wish to embody within the scope of the patent warranted hereon, all such embodiments as reasonably and properly come within the scope of my contribution to the art.

I claim:

1. A spring fastener for connecting together two layers of flexible sheet material, each layer having a substantially rigid annular eyelet lining the edge of a hole therein, comprising: a plug-like body of resilient plastic material having a head at one end and a stop flange with a diameter greater than that of said head at the other end, an intermediate flange between the ends of said body and having a diameter similar in size to that of said head, said body having at least two radial slots extending axially with an open outer end at said head and a closed inner end at said stop flange, said head and said intermediate flange being truncated at the diametral ends of said slots, there being a first circumferential groove between said stop flange and said intermediate flange receptive of one of the eyelets, and there being a second circumferential groove between said intermediate flange and said head receptive of the other of the eyelets.

2. A spring fastener according to claim 1, the axial side surfaces of said intermediate flange having an arcuate radial cross-section, the side surfaces of said slots diverging from the closed end to the open end of said slots, and said first circumferential groove having a diameter through said body greater than that of said second circumferential groove.

3. A spring fastener according to claim 1 in which the radial slots are formed as a diametral slot.

* * * * *